United States Patent
Lymer et al.

(10) Patent No.: US 7,624,450 B1
(45) Date of Patent: *Nov. 24, 2009

(54) SYSTEM, METHOD, AND COMPUTER PROGRAM PRODUCT FOR CONVEYING A STATUS OF A PLURALITY OF SECURITY APPLICATIONS

(75) Inventors: Brent J. Lymer, Sunnyvale, CA (US); Brad Kingsbury, Agoura Hills, CA (US); Chris Ritter, Dayton, OH (US)

(73) Assignee: McAfee, Inc., Santa Clara, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 11/735,877

(22) Filed: Apr. 16, 2007

Related U.S. Application Data

(63) Continuation of application No. 10/325,170, filed on Dec. 19, 2002, now Pat. No. 7,305,709, which is a continuation-in-part of application No. 10/319,288, filed on Dec. 13, 2002.

(51) Int. Cl.
*G06F 11/30* (2006.01)
(52) U.S. Cl. ........................................ 726/25
(58) Field of Classification Search .................... 726/25
See application file for complete search history.

(56) References Cited

U.S. PATENT DOCUMENTS

| | | | | |
|---|---|---|---|---|
| 5,333,256 A | * | 7/1994 | Green et al. ................. | 715/772 |
| 5,657,460 A | * | 8/1997 | Egan et al. ................... | 715/763 |
| 5,870,543 A | * | 2/1999 | Ronning ....................... | 726/33 |
| 5,956,481 A | | 9/1999 | Walsh et al. .................. | 726/23 |
| 5,991,881 A | | 11/1999 | Conklin et al. ................ | 726/22 |
| 6,088,804 A | | 7/2000 | Hill .............................. | 726/25 |
| 6,205,552 B1 | * | 3/2001 | Fudge .......................... | 726/25 |
| 6,266,774 B1 | | 7/2001 | Sampath et al. .............. | 713/201 |
| 6,269,456 B1 | | 7/2001 | Hodges et al. ................ | 714/38 |
| 6,282,709 B1 | * | 8/2001 | Reha et al. ................... | 717/175 |
| 6,298,445 B1 | | 10/2001 | Shostack et al. .............. | 726/25 |
| 6,304,975 B1 | | 10/2001 | Shipley ........................ | 726/22 |
| 6,327,594 B1 | | 12/2001 | Van Huben et al. .......... | 707/200 |
| 6,357,008 B1 | | 3/2002 | Nachenberg ................. | 726/24 |
| 6,493,871 B1 | * | 12/2002 | McGuire et al. ............. | 717/173 |
| 6,535,227 B1 | * | 3/2003 | Fox et al. ..................... | 715/736 |
| 6,553,378 B1 | * | 4/2003 | Eschelbeck .................. | 707/10 |
| 6,567,808 B1 | | 5/2003 | Eschelbeck et al. ........... | 707/10 |
| 6,704,874 B1 | | 3/2004 | Porras et al. .................. | 726/22 |
| 6,711,615 B2 | | 3/2004 | Porras et al. ................. | 709/224 |
| 6,715,083 B1 | | 3/2004 | Tovander ..................... | 726/23 |
| 6,785,732 B1 | | 8/2004 | Bates et al. .................. | 709/232 |

(Continued)

OTHER PUBLICATIONS

Dale Farris, Ontrack SystemSuite 3.0, "http://web.archive.org/web/20010427043719/http://www.gtpcc.org/gtpcc/systemsuite.htm" Apr. 27, 2001 pp. 1-3.*

(Continued)

*Primary Examiner*—Matthew B Smithers
(74) *Attorney, Agent, or Firm*—Zilka-Kotab, PC

(57) ABSTRACT

A system, method and computer program product are provided for displaying a status of a security application. A status of at least one security application is initially identified. An index is calculated that is representative of a degree of risk associated with the status of the at least one security application. The index is then displayed.

47 Claims, 16 Drawing Sheets

U.S. PATENT DOCUMENTS

| | | | |
|---|---|---|---|
| 6,898,715 B1 | 5/2005 | Smithson et al. | 726/24 |
| 6,948,169 B1* | 9/2005 | Amro et al. | 717/178 |
| 6,952,779 B1* | 10/2005 | Cohen et al. | 726/22 |
| 6,966,059 B1 | 11/2005 | Shetty et al. | 717/172 |
| 6,976,251 B2* | 12/2005 | Meyerson | 717/173 |
| 6,980,927 B2 | 12/2005 | Tracy et al. | 702/181 |
| 7,007,301 B2 | 2/2006 | Crosbie et al. | 726/23 |
| 7,010,696 B1* | 3/2006 | Cambridge et al. | 713/188 |
| 7,080,000 B1 | 7/2006 | Cambridge | 703/21 |
| 7,114,183 B1* | 9/2006 | Joiner | 713/188 |
| 7,134,141 B2 | 11/2006 | Crosbie et al. | 726/23 |
| 7,305,709 B1* | 12/2007 | Lymer et al. | 726/25 |
| 7,353,229 B2 | 4/2008 | Vilcauskas et al. | 707/10 |
| 7,434,177 B1 | 10/2008 | Ording et al. | 715/862 |
| 2002/0019945 A1 | 2/2002 | Houston et al. | 713/201 |
| 2002/0046299 A1 | 4/2002 | Lefeber et al. | 709/318 |
| 2002/0052950 A1 | 5/2002 | Pillai et al. | 709/224 |
| 2002/0059095 A1 | 5/2002 | Cook | 705/10 |
| 2002/0078382 A1 | 6/2002 | Sheikh et al. | 713/201 |
| 2002/0083343 A1 | 6/2002 | Crosbie et al. | 713/201 |
| 2002/0087643 A1 | 7/2002 | Parsons et al. | 709/206 |
| 2002/0133522 A1 | 9/2002 | Greetham et al. | 707/534 |
| 2002/0147803 A1* | 10/2002 | Dodd et al. | 709/223 |
| 2002/0171546 A1 | 11/2002 | Evans et al. | 340/540 |
| 2002/0178381 A1 | 11/2002 | Lee et al. | 713/201 |
| 2003/0084322 A1 | 5/2003 | Schertz et al. | 713/200 |
| 2003/0120733 A1 | 6/2003 | Forman | 709/206 |
| 2003/0135749 A1* | 7/2003 | Gales et al. | 713/200 |
| 2003/0149888 A1 | 8/2003 | Yadav | 713/200 |
| 2003/0154269 A1* | 8/2003 | Nyanchama et al. | 709/223 |
| 2003/0172301 A1* | 9/2003 | Judge et al. | 713/201 |
| 2003/0191966 A1 | 10/2003 | Gleichauf | 713/201 |
| 2003/0208687 A1 | 11/2003 | Liang et al. | 713/200 |
| 2004/0006704 A1* | 1/2004 | Dahlstrom et al. | 713/200 |
| 2004/0015719 A1 | 1/2004 | Lee et al. | 713/201 |
| 2004/0148281 A1* | 7/2004 | Bates et al. | 707/3 |
| 2004/0181685 A1 | 9/2004 | Marwaha | 713/201 |
| 2004/0225877 A1 | 11/2004 | Huang | 713/100 |
| 2004/0250133 A1 | 12/2004 | Lim | 713/201 |
| 2005/0010649 A1 | 1/2005 | Payne et al. | 709/217 |
| 2006/0021031 A1 | 1/2006 | Leahy et al. | 726/22 |
| 2006/0080735 A1 | 4/2006 | Brinson et al. | 726/22 |
| 2007/0273499 A1 | 11/2007 | Chlubek et al. | 340/521 |

OTHER PUBLICATIONS

Phillips et al, "A Graph Based System for Network Vulnerability Analysis", ACM, 1999, pp. 71-79.*
U.S. App. No. 10/318,559, filed Dec. 12, 2002.
U.S. Appl. No. 10/318,693, filed Dec. 12, 2002.
U.S. Appl. No. 10/319,288, filed Dec. 13, 2002.
U.S. Appl. No. 10/325,025, filed Dec. 19, 2002.
U.S. Appl. No. 11/855,109, filed Sep. 13, 2007.
Advisory Action Summary from U.S. Appl. No. 10/318,559 mailed on Mar. 30, 2007.
Office Action Summary from U.S. Appl. No. 10/318,559 mailed on Apr. 24, 2009.
Final Office Action Summary from U.S. Appl. No. 10/318,559 mailed on Jan. 11, 2007.
Final Office Action Summary from U.S. Appl. No. 10/318,559 mailed on Feb. 25, 2008.
Office Action Summary from U.S. Appl. No. 10/318,559 mailed on Jun. 21, 2006.
Office Action Summary from U.S. Appl. No. 10/318,559 mailed on Jul. 3, 2008.
Office Action Summary from U.S. Appl. No. 10/318,559 mailed on Jul. 24, 2007.
Office Action Summary from U.S. Appl. No. 10/318,559 mailed on Nov. 10, 2008.
Final Office Action Summary from U.S. Appl. No. 10/318,693 mailed on Oct. 5, 2006.
Office Action Summary from U.S. Appl. No. 10/318,693 mailed on May 8, 2006.
Final Office Action Summary from U.S. Appl. No. 10/318,693 mailed on May 30, 2007.
Office Action Summary from U.S. Appl. No. 10/318,693 mailed on Dec. 21, 2006.
Final Office Action Summary from U.S. Appl. No. 10/319,288 mailed on Nov. 28, 2007.
Office Action Summary from U.S. Appl. No. 10/319,288 mailed on Feb. 5, 2009.
Office Action Summary from U.S. Appl. No. 10/319,288 mailed on Apr. 18, 2006.
Office Action Summary from U.S. Appl. No. 10/319,288 mailed on Jun. 14, 2007.
Final Office Action Summary from U.S. Appl. No. 10/319,288 mailed on Nov. 1, 2006.
Advisory Action Summary from U.S. Appl. No. 10/319,288 mailed on Feb. 14, 2007.
Final Office Action Summary from U.S. Appl. No. 10/325,025 mailed on Jan. 29, 2007.
Final Office Action Summary from U.S. Appl. No. 10/325,025 mailed on Dec. 2, 2008.
Office Action Summary from U.S. Appl. No. 10/325,025 mailed on Jun. 22, 2006.
Office Action Summary from U.S. Appl. No. 10/325,025 mailed on May 16, 2008.
Office Action Summary from U.S. Appl. No. 10/325,025 mailed on Oct. 17, 2007.
Notice of Allowance from U.S. Appl. No. 10/325,170 mailed on Feb. 5, 2007.
Office Action Summary from U.S. Appl. No. 10/325,170 mailed on Jul. 5, 2006.
Examiner's Answer from U.S. Appl. No. 10/318,693 mailed on Apr. 17, 2008.
Norton Antivirus 2002 Users Guide (2001).
Norton Internet Security Professional 2002 User's Guide (2001).
Norton Internet Security Professional 2003 User's Guide (2002).
Dale, Farris, Ontrack SystemSuite 3.0, http://web.archive.org/web20010427043719/http://www.gtpcc.org/gtpcc/systemsuite.htm Apr. 27, 2001, pp. 1-3.
News Release "Symantec to Support New Version of Virus Scanning API for Microsoft Exchange 2000" Jun. 25, 2001.
Phillips et al., "A Graph Based System for Network Vulnerability Analysis", ACM, 1999, pp. 71-79.
Norton Anti Virus Corporate Edition User's Guide: 2000.
Office Action Summary from U.S. Appl. No. 10/318,559 which was mailed on May 16, 2006.
Phillips et al. "A Graph-Based System for Network-Vulnerability Analysis" ACM, 1999 pp. 71-79.
Final Office Action Summary from U.S. Appl. No. 10/318,693 which was mailed on Oct. 5, 2006.
Office Action Summary from U.S. Appl. No. 10/318,693 which was mailed on Oct. 5, 2006.
Final Office Action Summary from U.S. Appl. No. 10/319,288, mailed on Sep. 17, 2009.

* cited by examiner

SYSTEM, METHOD, AND COMPUTER PROGRAM PRODUCT FOR CONVEYING A STATUS OF A PLURALITY OF SECURITY APPLICATIONS

This application is a continuation of U.S. application No. 10/325,170 filed on Dec. 19, 2002, now U.S. Pat. No. 7,305,709 which, in turn, is a continuation-in-part of U.S. application No. 10/319,288 filed on Dec. 13, 2002, which is incorporated herein by reference.

FIELD OF THE INVENTION

The present invention relates to application management, and more particularly to application status reporting.

BACKGROUND OF THE INVENTION

In the space of just a few years, the Internet—because it provides access to information, and the ability to publish information, in revolutionary ways—has emerged from relative obscurity to international prominence. Whereas in general an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Security threats have evolved significantly with the increased popularity of the Internet. Advanced hybrid threats have been designed to attack systems on multiple fronts, sometimes searching for vulnerabilities until one is found. New threats also attempt to attack security technology itself.

Traditional consumer security software suites often include a plurality of various applications such as an anti-virus application, a firewall application, etc. In use, each application works to protect against at least one of the aforementioned threats. Together, the applications provide the comprehensive protection required in modern computing and networking environments.

As the security threats become more and more complex, however, the number of applications required to combat the threats becomes greater. With each application carrying its own functionality and reporting schemes, an administrator or user can easily become overwhelmed with security management.

DISCLOSURE OF THE INVENTION

A system, method and computer program product are provided for displaying a status of a security application. A status of at least one security application is initially identified. An index is calculated that is representative of a degree of risk associated with the status of the security application. The index is then displayed.

In one embodiment, the index may include a number between one (1) and ten (10). Moreover, a plurality of indices may be each calculated for one of a plurality of security applications.

In another embodiment, the security application may include an anti-virus security application, a firewall security application, a privacy service security application, and/or an anti-spam security application.

In one aspect of the present embodiment, the index may be associated with the status of an anti-virus security application. In such aspect, the index may reflect a signature file of the anti-virus security application. Moreover, the index may reflect a version of the anti-virus security application. Optionally, the index may be calculated using a weighted average of a plurality of aspects of the anti-virus security application.

In another aspect of the present embodiment, the index may be associated with the status of a firewall security application. In the present aspect, the index may reflect a version of the firewall security application.

In still another aspect of the present embodiment, the index may be associated with the status of a privacy service security application. As an option, the index may reflect a version of the privacy service security application.

In another embodiment, the index may include an overall index reflecting a plurality of security applications. Such overall index may be calculated using a weighted average of a plurality of separate indices associated with each of the security applications.

In still another embodiment, the index may be displayed numerically, graphically, utilizing a bar-graph, utilizing a color coding, etc. As an option, the color coding may correlate with the degree of risk associated with the status (i.e. green, amber, red).

Optionally, additional information relating to the status may be displayed upon the selection of the displayed index. Such additional information may include a link capable of being selected by a user. Action may then be taken to decrease the degree of risk associated with the status, in response to the selection of the link by the user.

Another system, method and computer program product are provided for displaying a status of a security application. A status of a security application is first identified. The status of the security application is then represented in the form of a bar graph which is displayed to a user.

Still another system, method and computer program product are provided for displaying a status of a plurality of security applications via a single interface. First determined is a degree of risk associated with a plurality of security aspects associated with a computing environment of a computer. The degree of risk associated with the security aspects may then be visually displayed utilizing a plurality of visual indicators.

DESCRIPTION OF THE PREFERRED EMBODIMENTS

Figure 1:
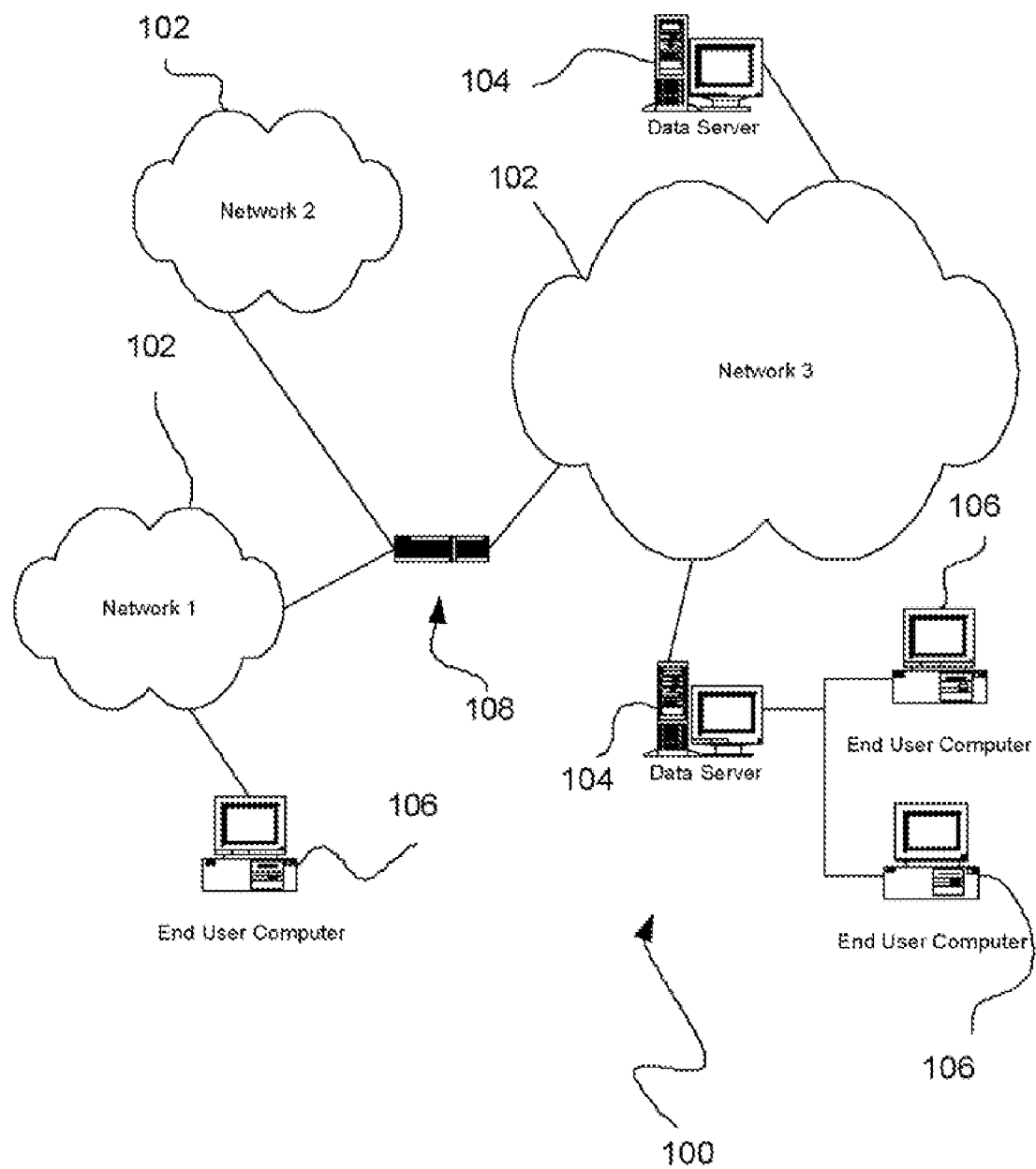
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Figure 2:
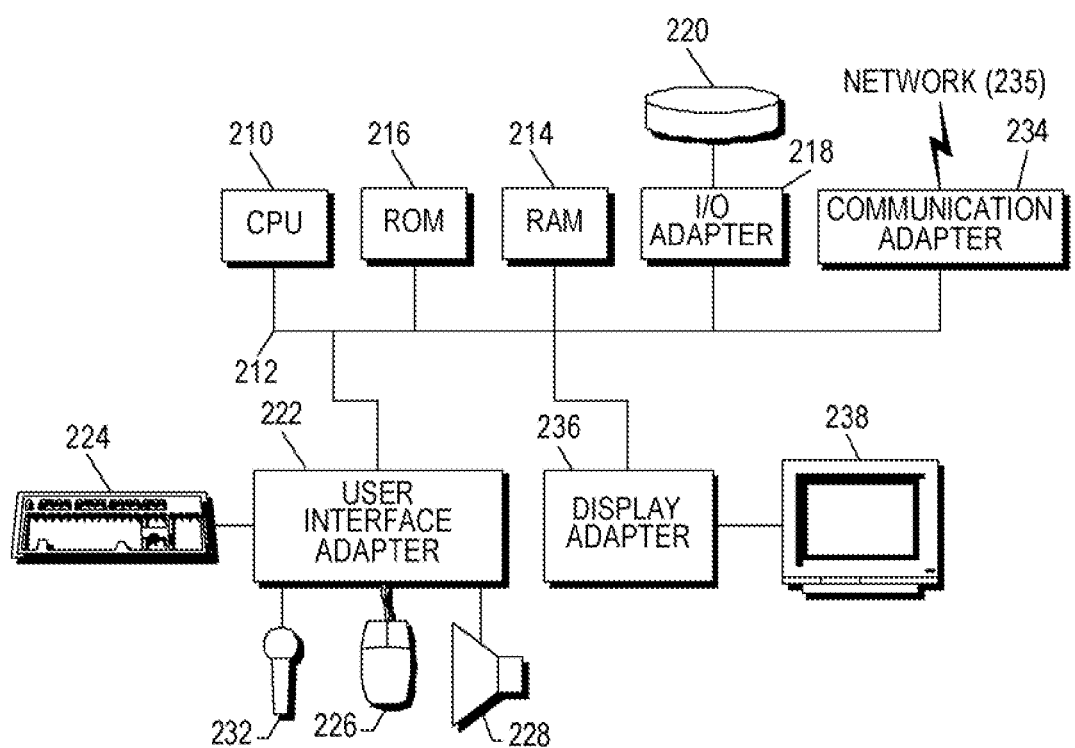
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
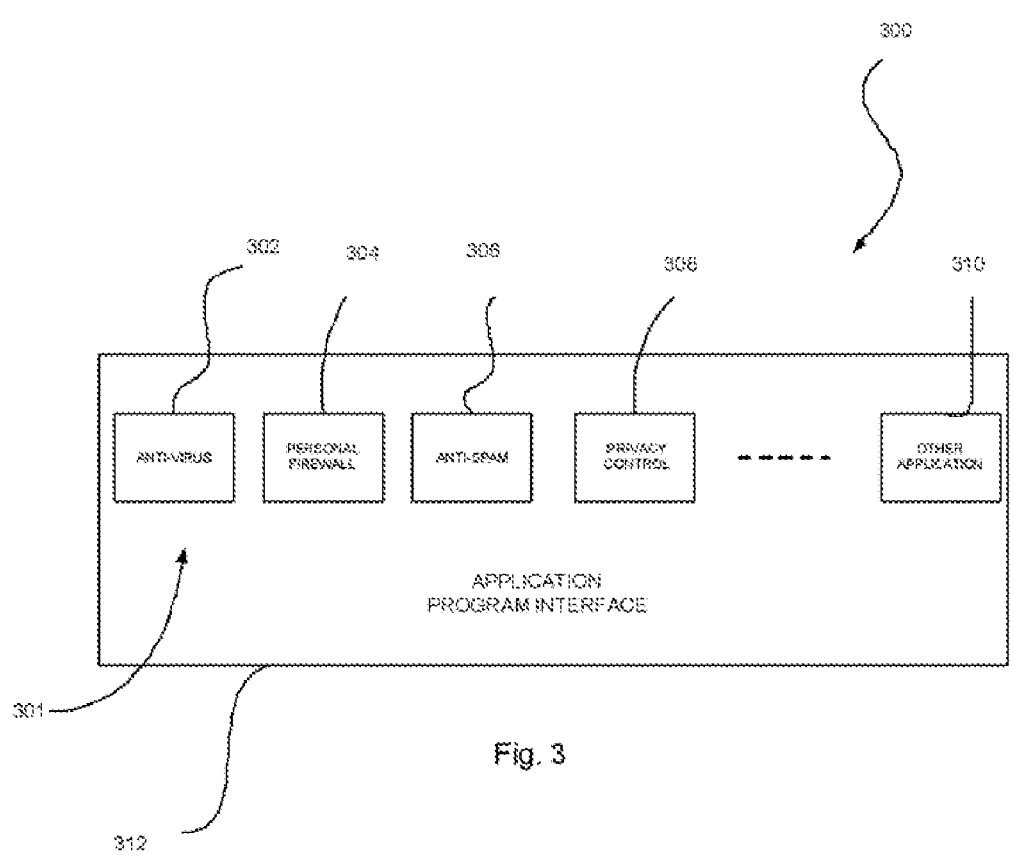
FIG. 3 illustrates a system adapted for interfacing a plurality of applications, in accordance with one embodiment.

FIG. 3 illustrates a system 300 adapted for interfacing a plurality of applications, in accordance with one embodiment. As an option, the present system 300 may be implemented in the context of the architecture of FIGS. 1 and 2. Of course, the system 300 may be implemented in any desired context.

As shown, included is a plurality of applications 301. In the context of the present description, such applications 301 may include any type of application program or computer code. For example, the applications 301 may optionally be security related. Of course, the applications 301 may be related to any other aspects such as business, maintenance, entertainment, etc. In any case, the applications may be related by the virtue of being associated with a similar aspect, purpose, etc.

In the security context, the applications 301 may include an anti-virus application 302, a firewall application 304, a privacy service application 308, an anti-spam application 306, and any other related application 310 (i.e. a utilities application, etc.).

In use, the anti-virus application 302 may be capable of scanning for viruses or other malicious code by comparing virus signature files with data located in memory or being transmitted via a network; and taking any appropriate response (i.e. quarantine data, delete data, clean data, alert user, etc.). Moreover, the firewall application 304 may be capable of blocking or alerting a user of accesses to a computer based on a predetermined set of rules or policies.

Still yet, the privacy service application 308 may be capable of protecting personal information on a computer and preventing the same from being shared. Still yet, the privacy service application 308 may be capable of preventing certain users from accessing predetermined content on a network such as the Internet. Moreover, the anti-spam application 306 may be capable of filtering electronic mail messages based on a predetermined rule set to prevent the receipt (or delivery) of unwanted e-mail.

As mentioned earlier, any other related application 310 may be included in the group of applications 301. For example, a utilities application may be included for executing various maintenance tasks associated with a computer (i.e. cleaning files, optimizing memory, etc.).

Further provided in combination with the applications 301 of the system 300 is an interface 312. In use, such interface 312 may include any specific method, technique or protocol by which an application program can communicate with an operating system or another application. In one embodiment, such interface 312 may include an application program interface.

The interface 312 may further include a graphical user interface for allowing access to the various applications 301. Such graphical user interface may further be used for indicating a status of the applications 301. More information relating to such graphical user interface will be set forth hereinafter in greater detail.

Figure 4:
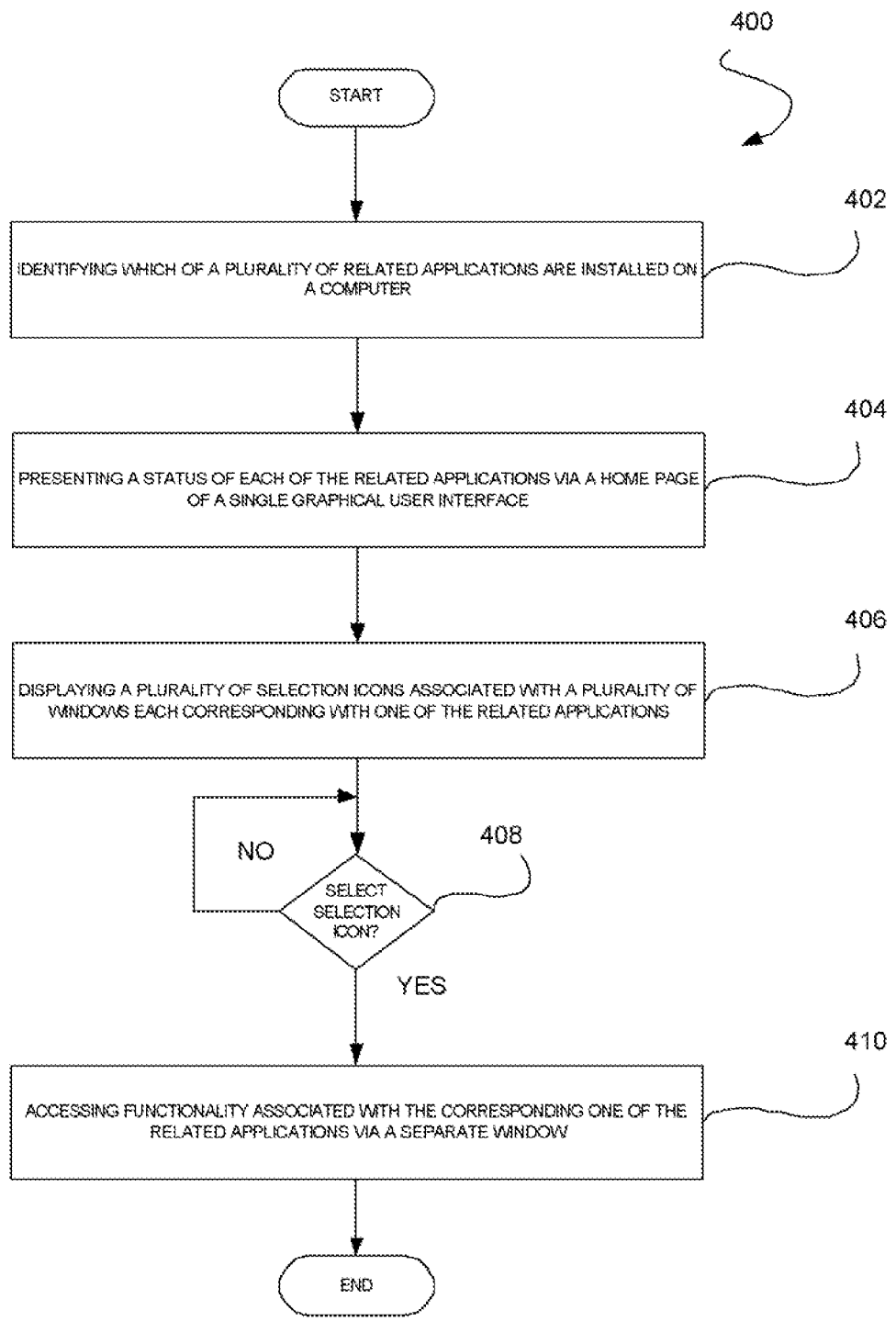
FIG. 4 illustrates a method for managing a plurality of applications via a single interface, in accordance with one embodiment.

FIG. 4 illustrates a method 400 for managing a plurality of applications via a single interface, in accordance with one embodiment. As an option, the present method 400 may be implemented in the context of the system 300 of FIG. 3. Of course, however, the method 400 may be carried out in any desired environment.

In operation 402, it is determined which of a plurality of applications are installed on a computer. The identification of the installed applications may be carried out in any desired manner. For example, a simple scan of the computer may be initiated. Moreover, such identification may involve the registration of the applications upon the installation thereof. It may then be determined that one of the applications is installed or not based on whether such application is registered. Optionally, such registration may involve an application program interface such as that mentioned during reference to FIG. 3. Of course, operation 402 may be carried out in any desired manner capable of identifying which applications are currently installed. Moreover, in a situation where the applications are simultaneously installed in the form of a suite, such identification may be simplified.

Next, in operation 404, a status of each of the applications is presented via a single graphical user interface. Such single graphical user interface may take any desired form capable of simultaneously conveying a status of each of the applications. As an option, such status may be displayed via a home page of the single graphical user interface. Such home page may include a "main" page or interface associated with the graphical user interface. More information regarding an exemplary single graphical user interface that may be used in the context of the present method 400 will be set forth during reference to subsequent figures.

In operation 406, a plurality of selection icons may be displayed, where the selection icons are associated with a plurality of windows. Such windows may each correspond with one of the applications, for reasons that will soon become apparent. In the present description, such selection icons may include any visual entity that is displayed and is capable of being selected by a user. Moreover, such windows may include any frame, portion, subset, or page associated with the graphical user interface and corresponding with one of the applications.

It is then determined in decision 408 whether one of the selection icons has been selected by a user. Upon the selection of the corresponding selection icon, a user is allowed to access one of the windows. Each of the windows may include access to functionality associated with the corresponding application. Thus, a user is provided access to such functionality conveniently from the graphical user interface. Note operation 410.

Figure 5:
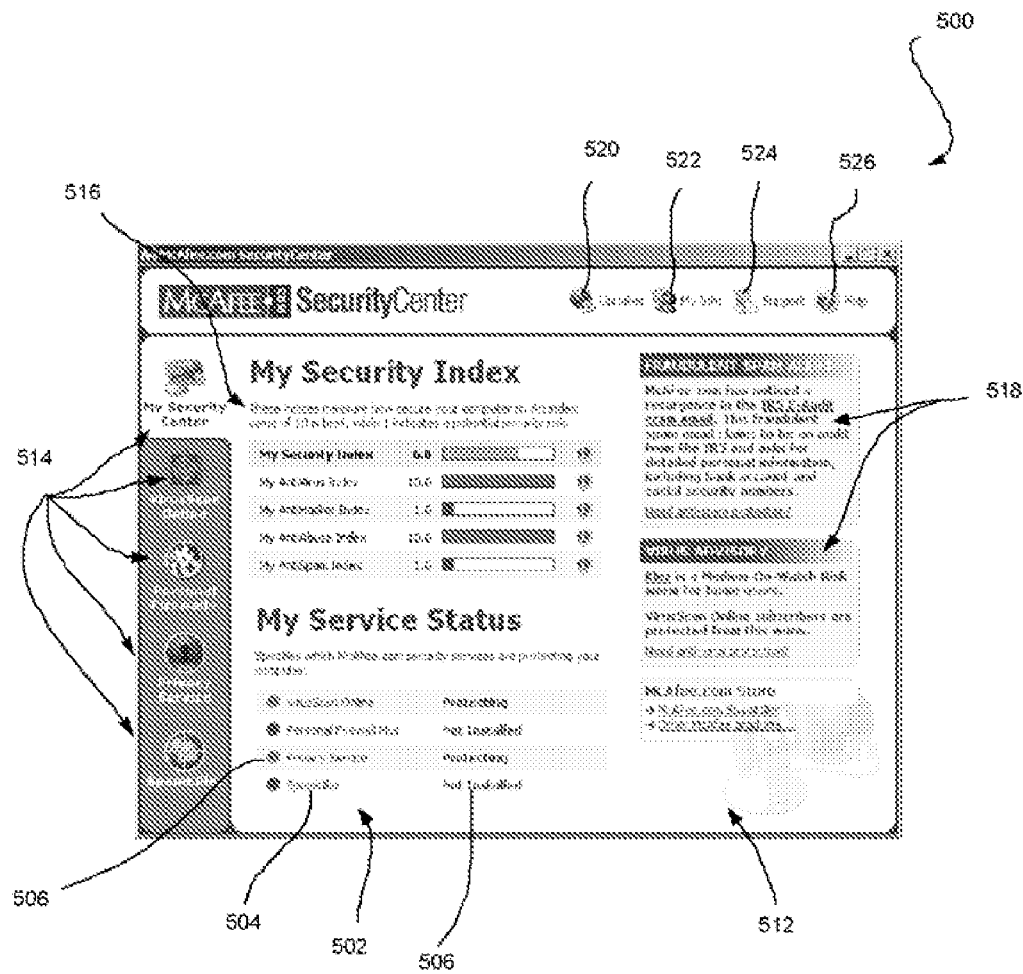
FIG. 5 illustrates an exemplary single graphical user interface for managing a plurality of applications, in accordance with one embodiment.

FIG. 5 illustrates an exemplary single graphical user interface 500 for managing a plurality of applications, in accordance with one embodiment. Optionally, such graphical user interface 500 may be used in the context of the system 300 and method 400 of FIGS. 3 and 4, respectively. Of course, the various features of the graphical user interface 500 may be used in any desired manner.

To allow access to each of the applications via the single graphical user interface 500, the graphical user interface may include a home page 512 and a plurality of selection icons 514 for allowing access to a plurality of windows (not shown) associated with each of the applications. Optionally, such windows may each include access to functionality associated with the corresponding one of the related applications. More information relating to such application-specific windows will be set forth in greater detail during reference to subsequent figures.

In use, the home page 512 may be adapted for displaying a visual indication as to the status of each of the applications, along with various other information. For example, a security index 516 may be provided for indicating a level of risk associated with various aspects (i.e. security aspects) of a computer or networking environment. More information relating to such security index 516 will be set forth in greater detail during reference to FIGS. 10 and 11. Further included is general information and alerts displayed in separate frames 518. As will soon become apparent, both the general information and alerts may be pushed from a server and further provide various options to a user. Thus, similar to the alerts to be described, the general information may involve dynamic functionality that changes over time, and pushed from a server to a plurality of clients. Still yet, the home page 512 may include a general update icon 520, a general additional information icon 522, a general support icon 524, and a general help icon 526.

To convey the status of each of the applications, the home page 512 of the single graphical user interface 500 may include a list 502 of a plurality of applications 504. Still yet, the single graphical user interface 500 may include a plurality of status indicators 506 adjacent to each of the applications 504 in the list 502.

Each status indicator 506 may indicate whether the corresponding application is installed. Moreover, each status indicator 506 may indicate whether the corresponding application is enabled. Still yet, each status indicator 506 may indicate whether a subscription associated with the corresponding application is expired. While this is shown to be accomplished using text, it should be noted that such status may be conveyed in any desired manner. As an option, each status indicator 506 may be color coded. For example, an icon may be included as a status indicator 506, as shown. In use, such icon may exhibit a red color to reflect the fact that an application is not installed, disabled or expired (i.e. security vulnerability present); and a green color may indicate that the application is installed and/or running (i.e. protection present). Still yet, an amber color may be used to reflect caution or some intermediate degree of vulnerability.

Of course, the status indicator 506 may include any combination of textual, graphic, numeric visuals that indicates a status of the applications 504. Moreover, such status may include installed, not installed, expired, enabled, disabled, version number or any other conceivable state of the applications.

Figure 6:
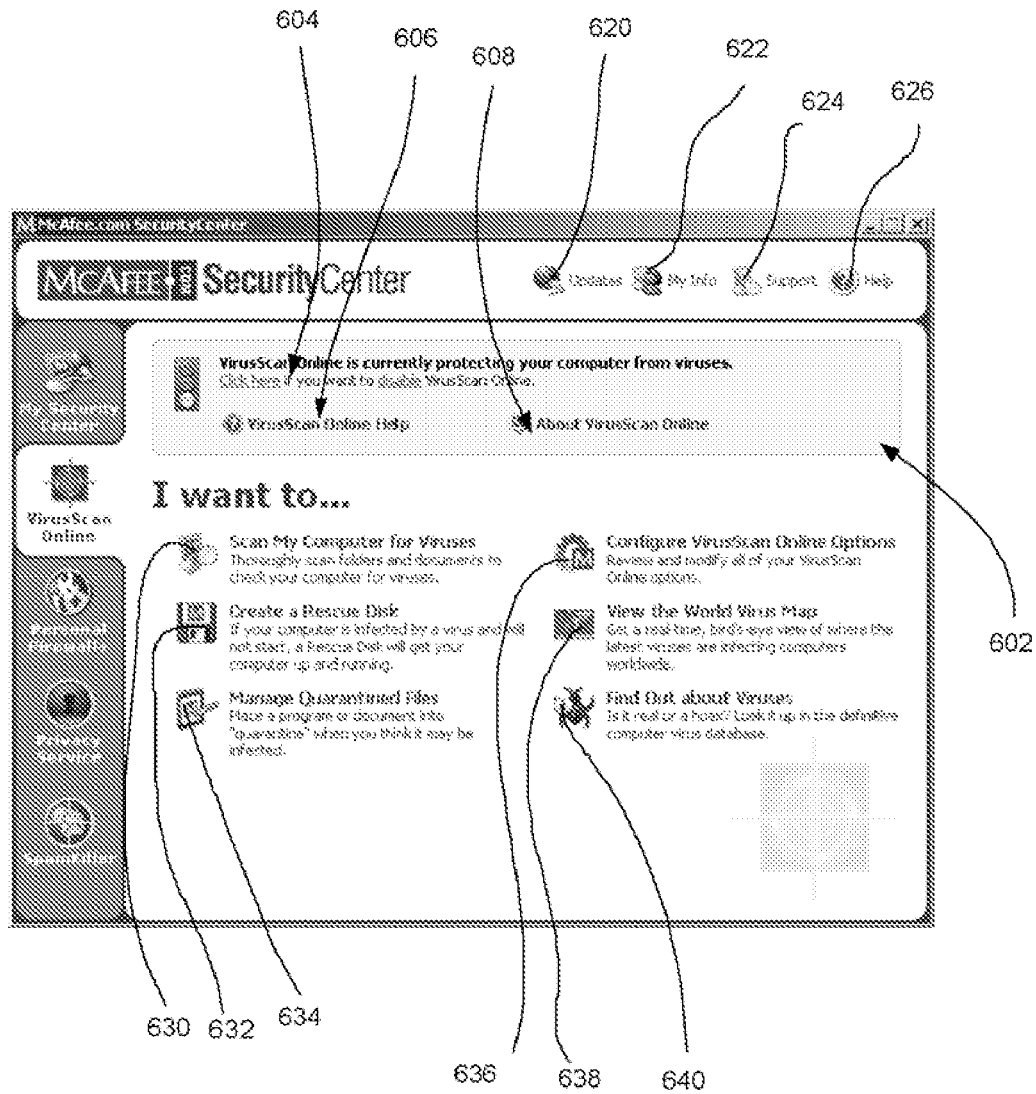
FIG. 6 illustrates an exemplary anti-virus application window associated with an anti-virus application, in accordance with one embodiment.

FIG. 6 illustrates an exemplary anti-virus application window 600 associated with an anti-virus application, in accordance with one embodiment. As an option, the present window 600 may be displayed in the context of the interface 500 of FIG. 5 and, specifically, in response to the selection of one of the selection icons 514 in accordance with operations 408-410 of the method 400 FIG. 4. Of course, however, the window 600 may be used out in any desired environment.

As shown, the anti-virus application window 600 may include a control frame 602 including an enable/disable icon 604 for selectively enabling/disabling the anti-virus application by a simple mouse-click or the like. Further provided in such control frame 602 are an application-specific help icon 606 and an application-specific information icon 608. Similar to the home page of FIG. 5, the anti-virus application window 600 may include a general update icon 620, a general additional information icon 622, a general support icon 624, and a general help icon 626.

In addition to the previous features, the anti-virus application window 600 may include a scan icon 630 for scanning data on the computer. A rescue disk icon 632 is provided for creating a rescue disk capable of rebooting a computer after being infected by a virus. Still yet, a quarantine icon 634 is provided for situating an allegedly or known to be infected file in a quarantine area. Further provided is a configure icon 636 for modifying various options associated with the anti-virus application. A virus map icon 638 may be used to view concentrations of infected data and sources of viruses on a world map. A virus information icon 640 may be used to locate general information regarding various viruses.

Figure 7:
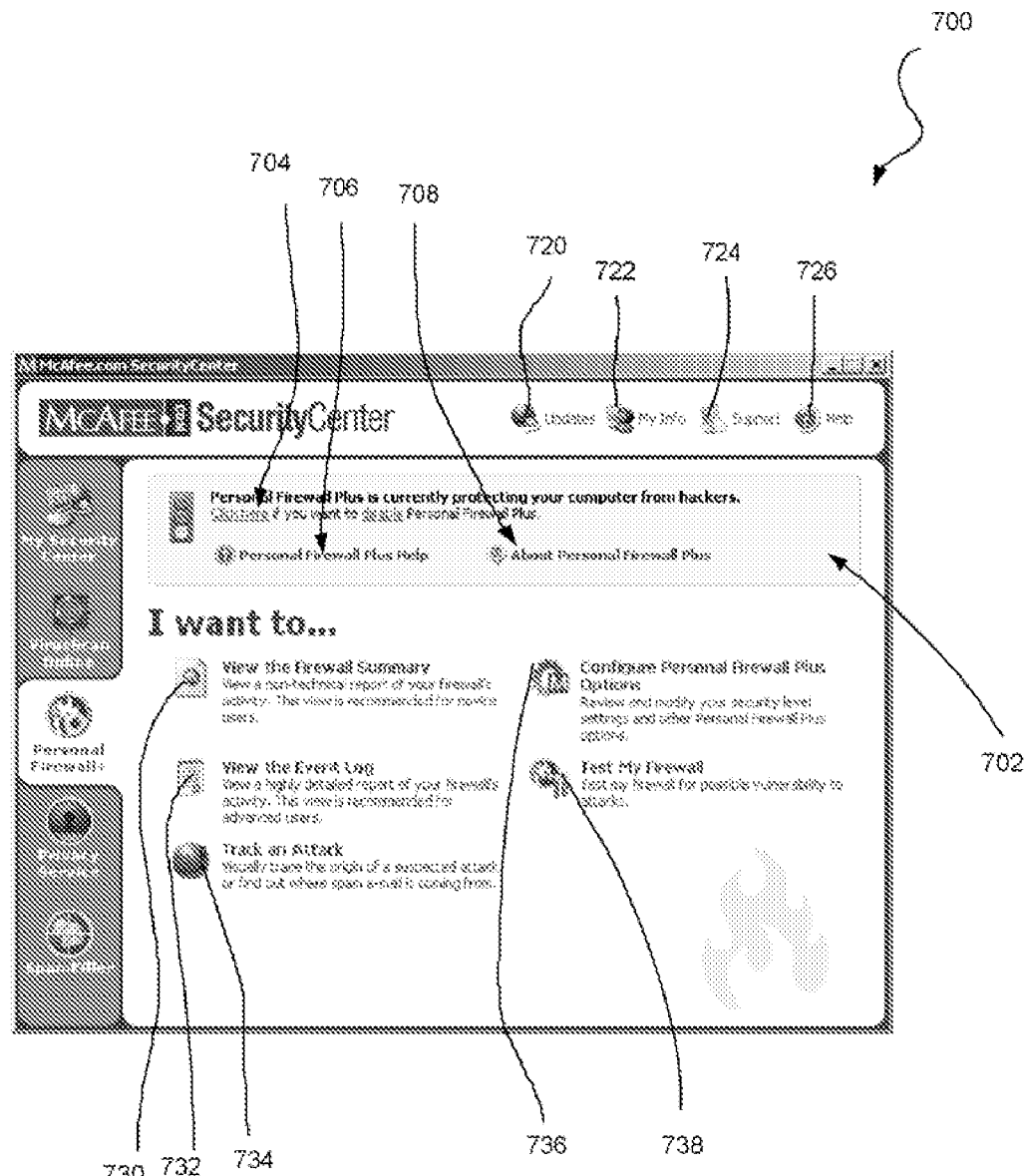
FIG. 7 illustrates an exemplary firewall application window associated with a firewall application, in accordance with one embodiment.

FIG. 7 illustrates an exemplary firewall application window 700 associated with a firewall application, in accordance with one embodiment. As an option, the present window 700 may be displayed in the context of the interface 500 of FIG. 5 and, specifically, in response to the selection of one of the selection icons 514 in accordance with operations 408-410 of the method 400 FIG. 4. Of course, however, the window 700 may be used out in any desired environment.

As shown, the firewall application window 700 may include a control frame 702 including an enable/disable icon 704 for selectively enabling/disabling the firewall application by a simple mouse-click or the like. Further provided in such control frame 702 are an application-specific help icon 706 and an application-specific information icon 708. Similar to the home page of FIG. 5, the firewall application window 700 may include a general update icon 720, a general additional information icon 722, a general support icon 724, and a general help icon 726.

In addition to the previous features, the firewall application window 700 may include a firewall summary icon 730 for viewing a non-technical report of firewall activity. Moreover, an event log icon 732 may be provided for viewing a technical highly-detailed report of the firewall activity. An attack may be traced on a map utilizing a track icon 734. Still yet, the firewall application may be configured and tested utilizing a firewall configure icon 736 and firewall test icon 738, respectively.

Figure 8:
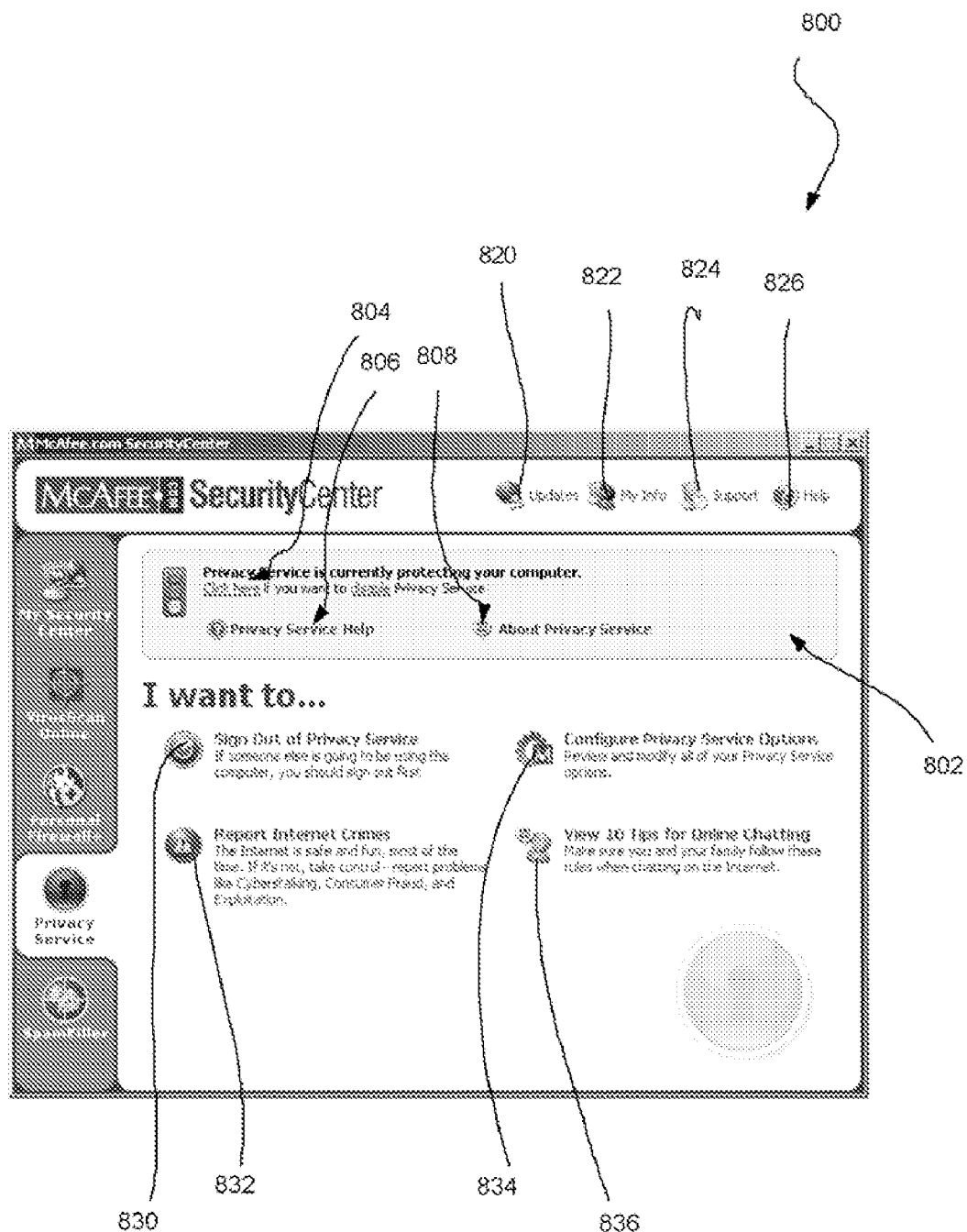
FIG. 8 illustrates an exemplary privacy service application window associated with a privacy service application, in accordance with one embodiment.

FIG. 8 illustrates an exemplary privacy service application window 800 associated with a privacy service application, in accordance with one embodiment. As an option, the present window 800 may be displayed in the context of the interface 500 of FIG. 5 and, specifically, in response to the selection of one of the selection icons 514 in accordance with operations 408-410 of the method 400 FIG. 4. Of course, however, the window 800 may be used out in any desired environment.

As shown, the privacy service application window 800 may include a control frame 802 including an enable/disable icon 804 for selectively enabling/disabling the privacy service application by a simple mouse-click or the like. Further provided in such control frame 802 are an application-specific help icon 806 and an application-specific information icon 808. Similar to the home page of FIG. 5, the privacy service application window 800 may include a general update icon 820, a general additional information icon 822, a general support icon 824, and a general help icon 826.

The privacy service application window 800 may further include a sign out icon 830 for signing out a current user so that a next user can use a computer. This is important since the privacy service application may selectively block content based on a user profile. Moreover, a report icon 832 may be included to report Internet-related crimes via a network. Still yet, the privacy service application may be configured utilizing a configure icon 834. A privacy information icon 836 may be used to obtain additional information relating to various privacy-related subjects (i.e. On-line chatting, etc.).

Figure 9:
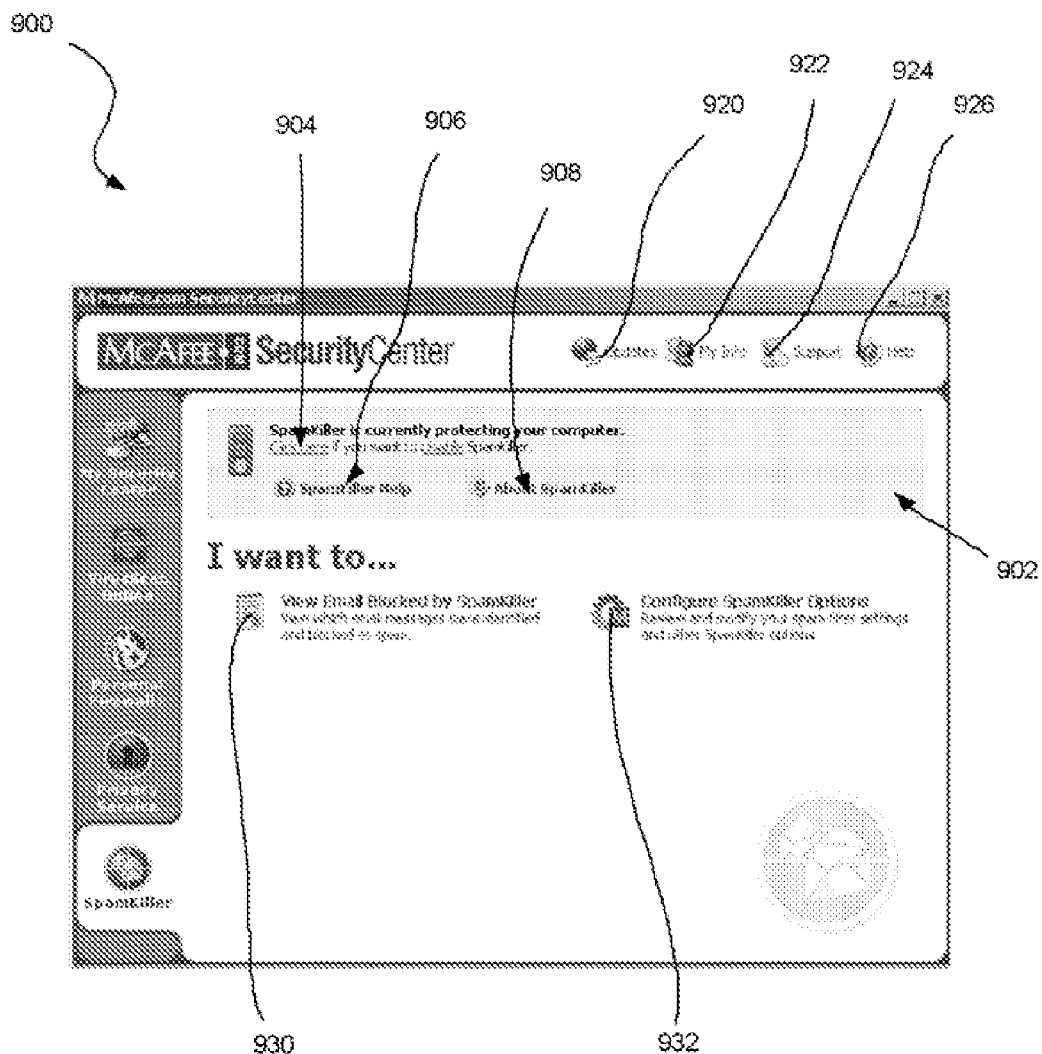
FIG. 9 illustrates an exemplary anti-spam application window associated with an anti-spam application, in accordance with one embodiment.

FIG. 9 illustrates an exemplary anti-spam application window 900 associated with an anti-spam application, in accordance with one embodiment. As an option, the present window 900 may be displayed in the context of the interface 500 of FIG. 5 and, specifically, in response to the selection of one of the selection icons 514 in accordance with operations 408-410 of the method 400 FIG. 4. Of course, however, the window 900 may be used out in any desired environment.

As shown, the anti-spam application window 900 may include a control frame 902 including an enable/disable icon 804 for selectively enabling/disabling the anti-spam application by a simple mouse-click or the like. Further provided in such control frame 902 are an application-specific help icon 906 and an application-specific information icon 908. Similar to the home page of FIG. 5, the anti-spam application window 900 may include a general update icon 920, a general additional information icon 922, a general support icon 924, and a general help icon 926.

Moreover, the anti-spam application window 900 may further include a blocked e-mail icon 930 adapted for allowing a user to view e-mail that has been blocked by the anti-spam application. As an option, the anti-spam application may be configured utilizing a configure icon 932.

Figure 10:
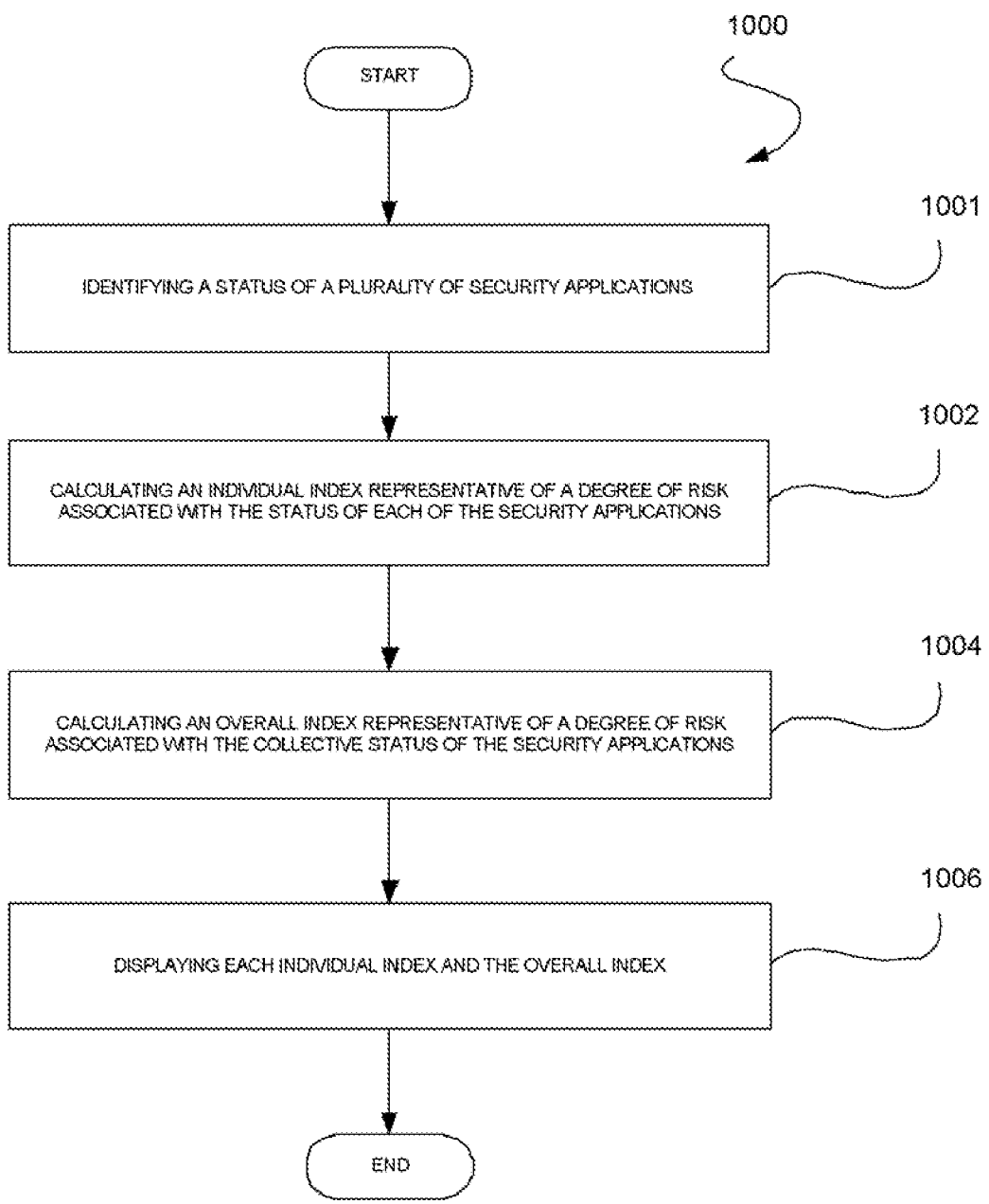
FIG. 10 illustrates a method for displaying a status of a security application, in accordance with one embodiment.

FIG. 10 illustrates a method 1000 for displaying a status of a security application, in accordance with one embodiment. As an option, the present method 1000 may be implemented in the context of the system 300 of FIG. 3. Of course, however, the method 1000 may be carried out in any desired environment.

In operation 1001, a status of at least one security application is identified. In one embodiment, the status of a plurality of applications may be identified. As set forth before, the status may include installed, not installed, expired, enabled, disabled, version number, update status or any other conceivable state of each application.

Next, in operation 1002, an individual index representative of a degree of risk associated with the status of each security application is calculated. Again, one individual index may be calculated for each security application or, in other words, a plurality of indices may be calculated for multiple security applications.

In one embodiment, each individual index may be calculated using a plurality of aspects of the status of the associated security application. Just by way of example, a signature file of the security application and/or a version of the security application may be used to calculate the individual index. More information regarding exemplary techniques of calculating the indices will be set forth in greater detail during reference to FIG. 11 and Appendix A.

As an option, each index may include a number between one (1) and ten (10). Of course, each index may include any alphanumeric range or merely include symbols, etc.

Instead of or in addition to calculating the individual index in operation 1002, an overall index may be calculated which is representative of a degree of risk associated with the collective status of the security applications. Note operation 1004. In one embodiment, such calculation may include a weighted average of the individual indices associated with each of the security applications.

In operation 1006, each individual index and/or the overall index are displayed. Of course, such display may be accomplished in any desired manner. Just by way of example, the indices may be displayed alphanumerically, graphically, utilizing a bar-graph, utilizing a color coding, etc. As an option, the color coding may correlate with the degree of risk associated with the status, as will soon become apparent during the description of the exemplary interface of the following figure.

Figure 11:
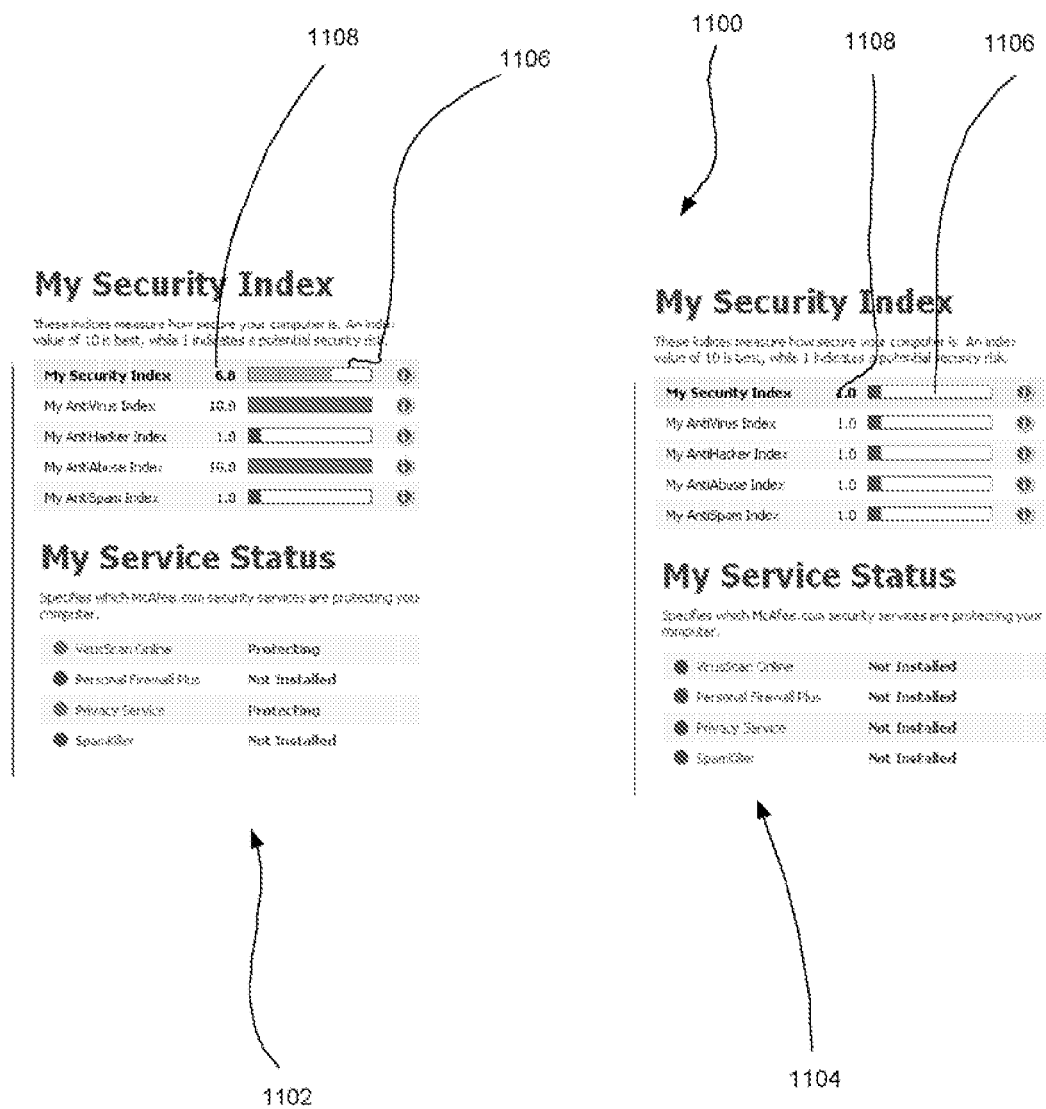
FIG. 11 illustrates an exemplary graphical user interface for displaying a status of at least one security application, in accordance with one embodiment.

FIG. 11 illustrates an exemplary graphical user interface 1100 for displaying a status of at least one security application, in accordance with one embodiment. Optionally, such graphical user interface 1100 may be used in the context of the system 300 and method 1000 of FIGS. 3 and 10, respectively. Of course, the various features of the graphical user interface 1100 may be used in any desired manner.

As shown, two versions 1102, 1104 of the graphical user interface 1100 are shown to reflect different statuses of the various applications associated therewith. Included with the graphical user interface 1100 is a plurality of bar graphs 1106 each associated with a corresponding application. The size of each bar graph 1106 is commensurate with a numerical index 1108 associated therewith, and optionally positioned adjacent thereto.

Moreover, the bar graphs 1106 may be color-coded. Specifically, the color of each bar graph 1106 may be based on the associated numerical index 1108. Just by way of example, each bar graph 1106 may include a red color upon the numerical index 1108 falling below a predetermined numerical index threshold, thus representing a high degree of risk associated with the current status of the associated application. Conversely, each bar graph 1106 may include a green color upon the numerical index 1108 rising above a predetermined numerical index threshold, thus representing a low degree of risk associated with the current status of the associated application.

As shown in FIG. 11, both an overall index and individual indices are provided with the graphical user interface 1100. As mentioned earlier, the various indices may be calculated in a variety of ways.

In one embodiment, an index associated with the status of an anti-virus security application may reflect a signature file of the anti-virus security application and/or a version of the anti-virus security application. Optionally, such index may be calculated using a weighted average of a plurality of aspects of the anti-virus security application including the signature file of the anti-virus security application and the version of the anti-virus security application.

In another embodiment where the index is associated with the status of a firewall security application, the index may reflect a version of the firewall security application. Similarly, in still another embodiment where the index is associated with the status of a privacy service security application, the index may reflect a version of the privacy service security application.

In yet another embodiment where the index includes an overall index reflecting a plurality of security applications, such overall index may be calculated using a weighted average of a plurality of separate indices associated with each of the security applications.

With continuing reference to FIG. 11, the various indices 1106 shown with the two versions 1102, 1104 of the graphical user interface 1100 are clearly different due to the dependence of the status of the related applications. See such application statuses listed below the indices 1106.

Appendix A sets forth a detailed exemplary technical specification for calculating and presenting the security indices set forth in FIG. 11. It should be noted that such specification is set forth for illustrative purposes only, and should not be construed as limiting in any manner.

Optionally, additional information relating to the status may be displayed upon the selection of the appropriate displayed index 1106. For example, a window associated with the appropriate application (see, for example, FIGS. 6-9) may be displayed. Such additional information may include a link capable of being selected by a user. Action may then be taken to decrease the degree of risk associated with the status, in response to the selection of the link by the user. For instance, a more recent version or update of the application may be downloaded.

Figure 12:
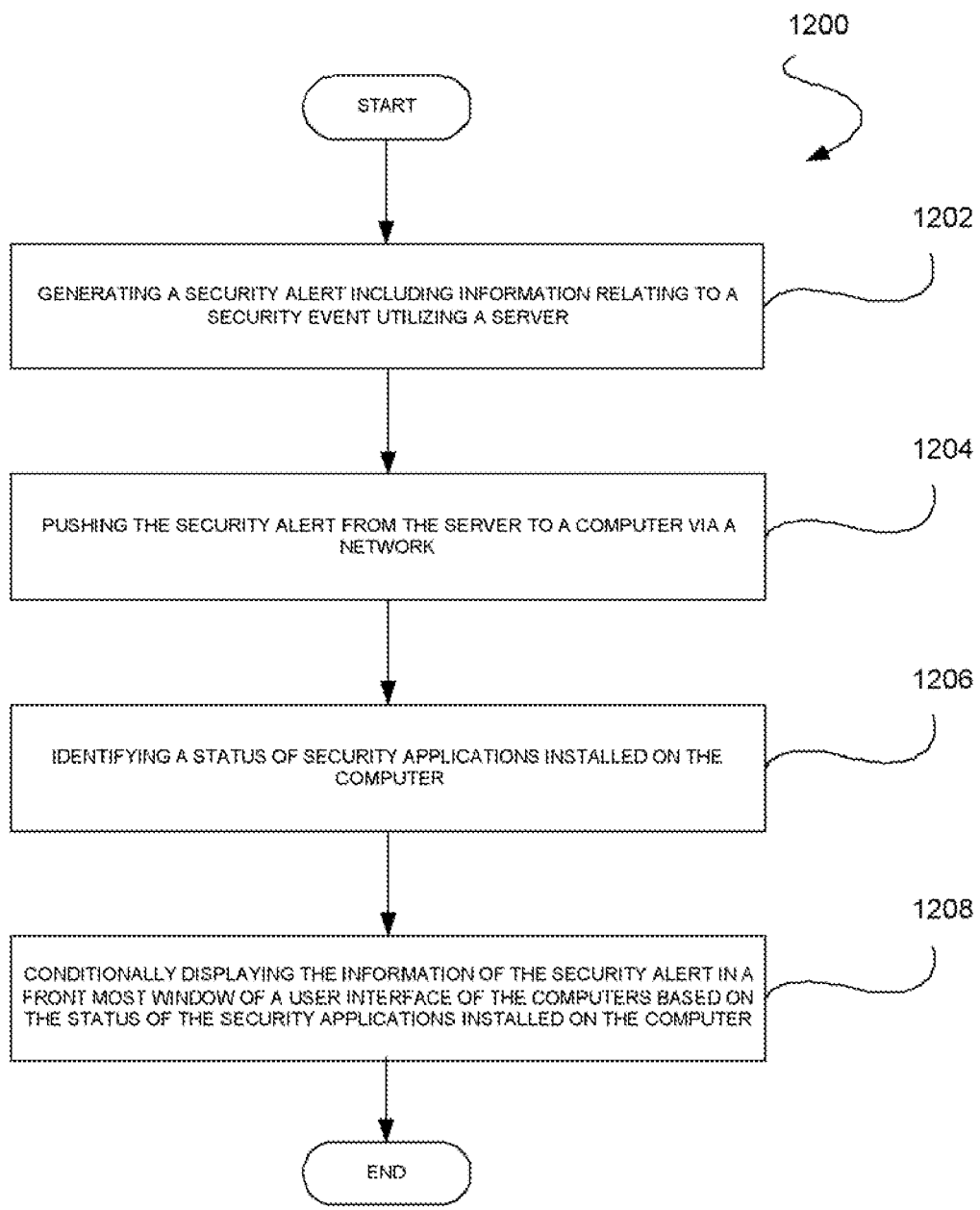
FIG. 12 illustrates a method for alerting users of a plurality of computers of a security event via a network, in accordance with one embodiment.

FIG. 12 illustrates a method 1200 for alerting users of a plurality of computers of a security event via a network, in accordance with one embodiment. As an option, the present method 1200 may be implemented in the context of the system 300 of FIG. 3. Of course, however, the method 1200 may be carried out in any desired environment.

Initially, in operation 1202, a security alert is generated including information relating to a security event utilizing a server. The security alert may take any desired format (i.e. HTML, XML, etc.) capable of being transmitted via a network and eventually displayed on a user computer. Moreover, the information may include any data relevant to the security event. Table 1 illustrates some exemplary information that may be included with the security alert. Of course, such information is set forth for illustrative purposes only, and should not be construed as limiting in any manner.

Table 1

Alert status (i.e. high, medium, low, etc.)
Possible Response Actions (i.e. get security application or an update thereof, get more information, etc.)
Content (i.e. description of security event, etc.)

It should be noted that the foregoing alert status may be generated in any desired manner. For example, it may be gleaned from an organization such as the Anti-Virus Emergency Response Team (AVERT) administered by NETWORK ASSOCIATES, INC®.

Thus, the information may include a level of the security alert. Such level of the security alert may, in turn, reflect a level of risk associated with the security event. Moreover, the information may include at least one proposed user action relating to the security event. For example, such proposed user action may involve obtaining more information relating to the security event and/or obtaining protection from the security event. Further, the information may include a response automatically carried out in reaction to the security event. For example, such response may include scanning a computer, scanning a file, cleaning a file, and/or blocking access to a computer. Still yet, the information may simply include a description of the security event.

Next, in operation 1204, the security alert is pushed from the server to a plurality of user computers via a network such as the Internet. In the context of the present description, such pushing may include any technique where the server initiates the delivery of the security alert to the user computers.

It should be noted that the foregoing pushing may be accomplished in a variety of foreseeable ways. Just by way of example, the security alert pushed from the server to the user computers may actually come as the result of a programmed request from the user computers. That is, a client program may be used to facilitate such pushed security alerts. This program may further capture a user profile for reasons that will soon become apparent.

Still yet, the pushing may include a simple broadcasting of the security alert. In this case, the security alert may be pushed to the user computers that have access to a particular channel or frequency. Broadcast may (but not always) involve a continuous flow of information.

As mentioned earlier, a user profile may be obtained during the course of the present method 1200. In particular, in operation 1206, a status of security applications on the computer may be identified. Such user profile may include data relating to a security application installed on a computer. For example, the status may indicate whether the security application is installed, enabled, etc. Also, the status may indicate whether a subscription associated with the security application is expired.

The specific profile identified in operation 1206 may, in turn, be used to conditionally display the information of the security alert based on the status of the security application(s) on the computer. Note operation 1208.

For example, the security alert may include a plethora of user options such as updating a particular security application, etc. However, if upon delivery of the security alert, it may be determined that the particular security application is not installed, expired. etc. In such case, an option to obtain the security application may be displayed, as opposed to an option to obtain an update.

Thus, in one embodiment, a large amount of information associated with the security alert may be downloaded to accommodate the numerous statuses associated with different computers. This may be feasible, for example, since large amounts of HTML information may be efficiently transmitted over a network such as the Internet. Logic (i.e. an application program interface, plug-in, etc.) may then be used to parse the large amount of information into a subset which is to be displayed based on the status of the security applications. Of course, some of such logic may conceivably be carried out on the server such that the alerts are tailored prior to being pushed.

In any case, the security alert may be displayed in a front most window of a user interface of the computers. In the present description, such a window may include any frame, portion, etc. of the user interface. By virtue of the aforementioned pushing, such display may be carried out in an automatic fashion, thus alerting users as soon as possible. One exemplary security alert will be set forth in greater detail during reference to FIGS. 13 and 14.

Figure 13:
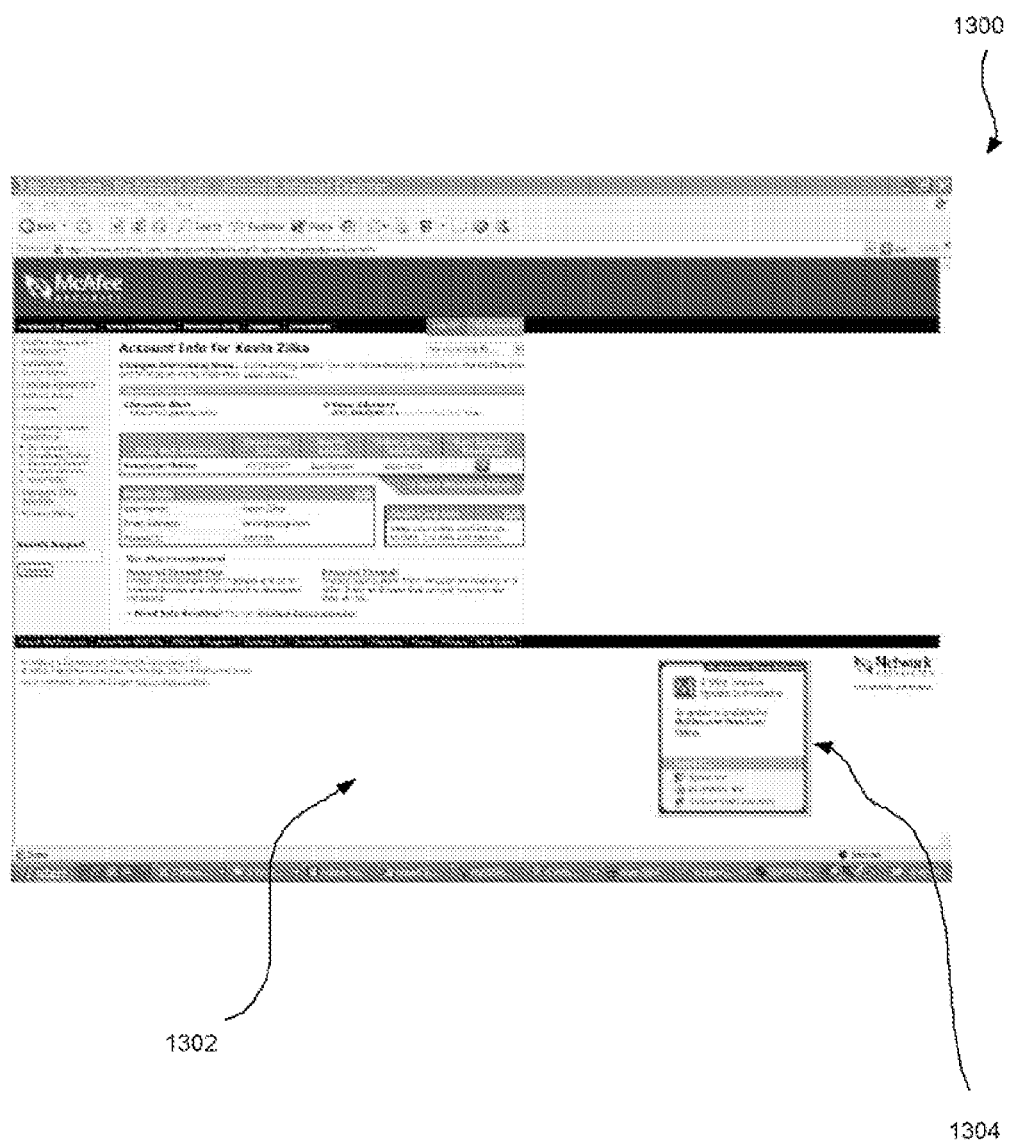
FIG. 13 illustrates an exemplary graphical user interface for alerting users of a plurality of computers of a security event via a network, in accordance with one embodiment.

FIG. 13 illustrates an exemplary graphical user interface 1300 for alerting users of a plurality of computers of a security event via a network, in accordance with one embodiment. Optionally, such graphical user interface 1300 may be used in the context of the method 1200 of FIG. 12. Of course, the various features of the graphical user interface 1300 may be used in any desired manner.

As shown, the graphical user interface 1300 includes a front most window 1304 which is automatically displayed over a background window 1302 that was running at the time the pushed security alert was received. Optionally, the front most window 1304 may be moved about the background window 1302 while a user decides how to react to the security alert.

Still yet, the user may continue work in the background window 1302 while the front most window 1304 is maintained in the foreground. Moreover, this foreground status of the front most window 1304 may be maintained despite the background window 1302 being changed as a result of the user changing applications, etc. As an option, the front most window 1304 may stay in the foreground until the user selects one of the options set forth in the security alert. More information regarding the design of a specific security alert will be set forth during reference to FIG. 14.

Figure 14:
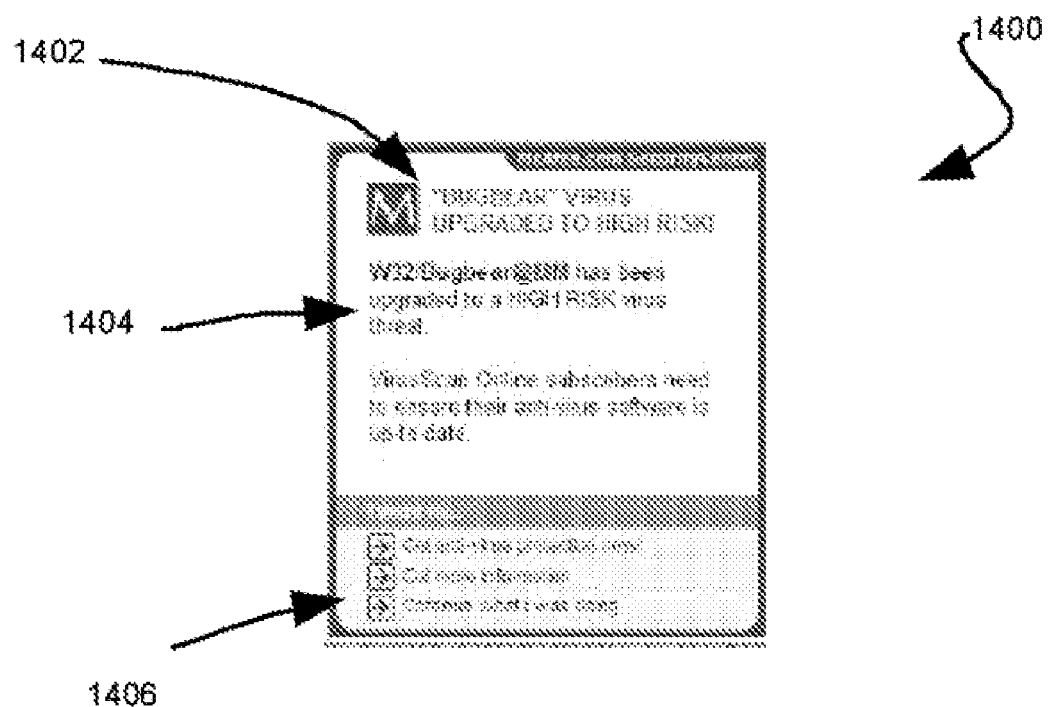
FIG. 14 illustrates an exemplary security alert for alerting users of a plurality of computers of a security event via a network, in accordance with one embodiment.

FIG. 14 illustrates an exemplary security alert 1400 for alerting users of a plurality of computers of a security event via a network, in accordance with one embodiment. Optionally, such security alert 1400 may be used in the context of the method 1200 of FIG. 12 and the interface 1300 of FIG. 13. Of course, the various features of the security alert 1400 may be used in any desired manner.

As shown, the security alert 1400 may include a square or rectangular window with a first portion 1402 including a description 1404 of the security event. As shown, such description includes an alert level associated with the security event. Again, such description and alert level may be pushed as part of the information corresponding with the security alert 1400.

Further provided is a second portion 1406 including a number of proposed response options displayed to the user based on the profile of the user (i.e. status of the applications on the computer, etc.). Such response options may be carried out by the selection thereof by a user utilizing a mouse-click or the like. While this may be accomplished in any desired manner, one exemplary method may include the technique set forth in U.S. Pat. No. 6,266,774 entitled "Method and system for securing, managing or optimizing a personal computer," which is incorporated herein by reference in its entirety.

It should be noted that the security alert shown in FIG. 14 may also serve as a marketing agent in addition to its inherent security function. For example, a status of a subscription of a subscriber of an application-related service may be first identified utilizing a server. An alert may then be conditionally pushed to the subscriber of the application-related service via a network based on the status. A purchase link may then be displayed with the alert which is capable of being used by the subscriber of the application-related service to renew the subscription for the application-related service via the network.

Moreover, a status of security applications on the computer may be identified upon the receipt of a security alert like that shown in FIG. 14. A purchase link may then be conditionally displayed with the security alert based on the status of the security applications on the computer. Such purchase link is capable of being utilized by a user of the computer to purchase a service related to the security applications in response to the security event associated with the security alert.

As an option, the security alert 1400 may be color-coded to reflect a level of severity associated with the alert. For example, red may reflect a high severity (i.e. including security alerts), blue may reflect a medium severity (i.e. including application tasks), and green may reflect a low severity (i.e. including application responses, marketing or general information).

Figure 15:
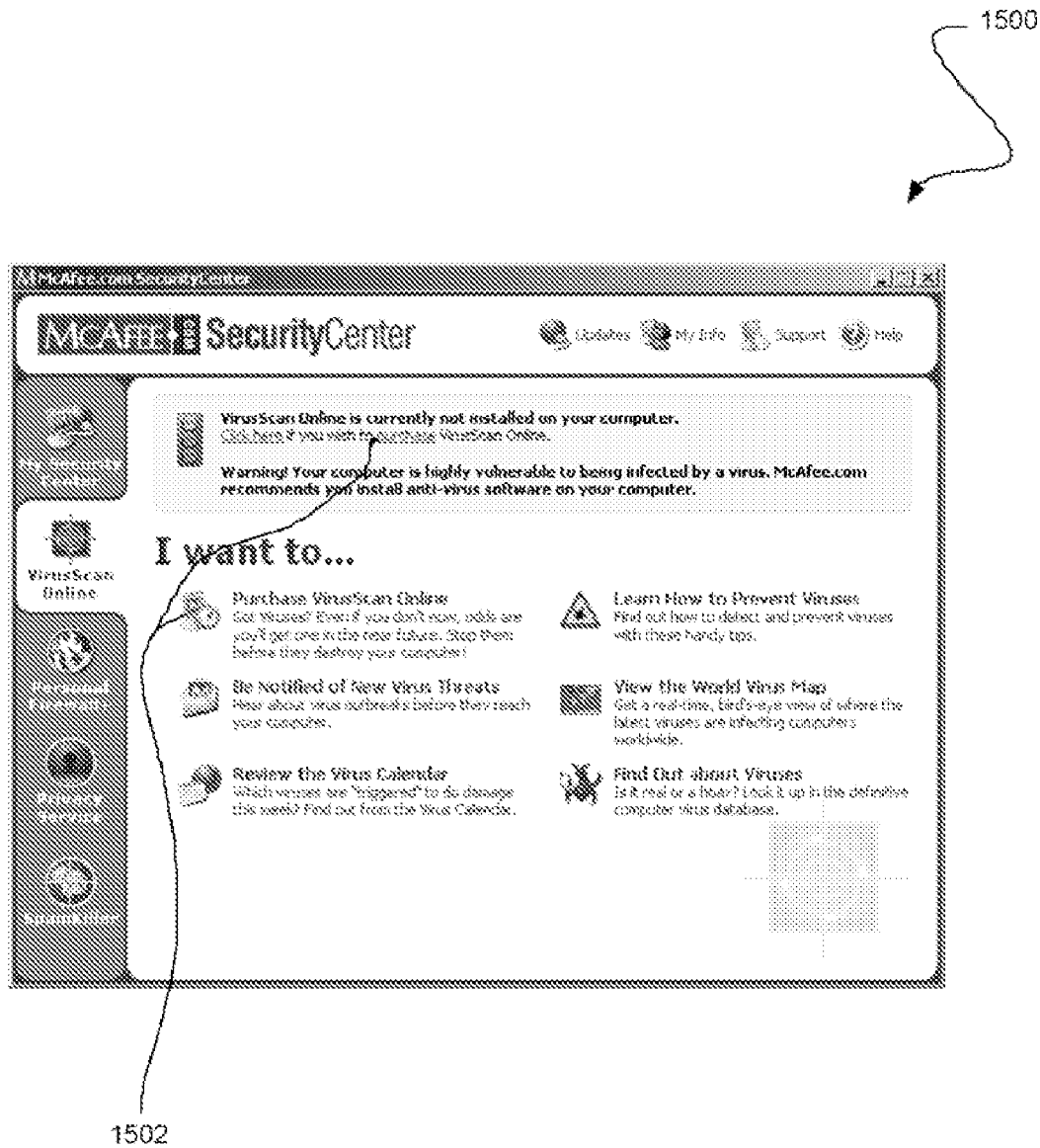
FIG. 15 illustrates an exemplary graphical user interface for selling application-related services, in accordance with one embodiment.

FIG. 15 illustrates an exemplary graphical user interface 1500 for selling application-related services, in accordance with one embodiment. Optionally, such graphical user interface 1500 may be used in the context of the method 400 of FIG. 4. For example, the graphical user interface 1500 may be displayed upon the selection of one of the selection icons 514 of FIG. 5, when the related application is not installed, expired, etc. Of course, the various features of the graphical user interface 1500 may be used in any desired manner.

As shown, a plurality of purchase links 1502 is conditionally displayed based on the status of the related applications on the computer. Such purchase link may be capable of being utilized by a user of the computer to purchase a service associated with the related applications via the network.

Figure 16:
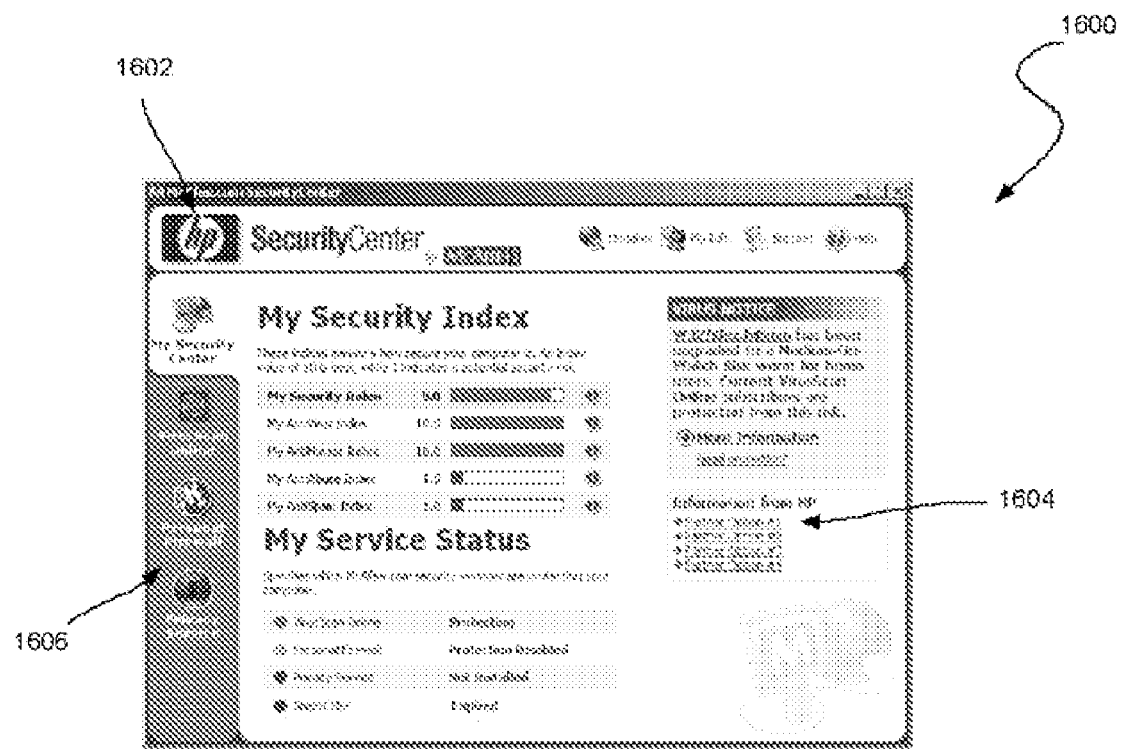
FIG. 16 illustrates an exemplary graphical user interface tailored to manage a plurality of related applications of a specific entity (i.e. company, organization, etc.), in accordance with one embodiment.

FIG. 16 illustrates an exemplary graphical user interface 1600 tailored to manage a plurality of related applications of a specific entity (i.e. company, organization, etc.), in accordance with one embodiment. Optionally, such graphical user interface 1600 may be used in the context of the method 400 of FIG. 4. Of course, the various features of the graphical user interface 1600 may be used in any desired manner.

As shown, the graphical user interface 1600 includes a field for a specific entity logo 1602 using the present system. Moreover, various tailored user options 1604 are provided to accommodate the specific needs of the entity. Also, the various selection icons 1606 may be selectively displayed based on whether the applications are being used by the entity.

To accomplish this, a plurality of fields associated with such aspects of the multi-application managing interface may be made available to a desirer or administrator. In one embodiment, such fields may be provided via a management/designer/programmer interface or the like. Such fields are subsequently filled with content tailored to an entity (i.e. a specific company) including a multiplicity of computers each equipped with multi-application managing interface. Thus, the multi-application managing interface may be displayed on the computers with the content.

Optionally, a data structure may be provided for tailoring a multi-application managing interface. Included with the data structure is a map object for mapping a plurality of fields with content tailored to an entity including a multiplicity of computers each including a multi-application managing interface. Such fields are associated with a plurality of aspects of the multi-application managing interface.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium storing instructions, comprising:
   computer code for identifying a status of at least one security application;
   computer code for calculating an index representative of a degree of risk associated with the status of the at least one security application; and
   computer code for displaying the index;
   wherein the index reflects a signature file of an anti-virus security application.

2. The computer program product as recited in claim 1, wherein the index includes a number between one (1) and ten (10).

3. The computer program product as recited in claim 1, wherein the computer program product is operable such that a plurality of indices are each calculated for one of a plurality of security applications.

4. The computer program product as recited in claim 3, wherein the security applications include at least one of the anti-virus security application, a firewall security application, a privacy service security application, and an anti-spam security application.

5. The computer program product as recited in claim 1, wherein the computer program product is operable such that the index is associated with the status of the anti-virus security application.

6. The computer program product as recited in claim 1, wherein the computer program product is operable such that the index is associated with the status of a firewall security application.

7. The computer program product as recited in claim 1, wherein the computer program product is operable such that the index is associated with the status of a privacy service security application.

8. The computer program product as recited in claim 1, wherein the computer program product is operable such that the index is displayed numerically.

9. The computer program product as recited in claim 1, wherein the computer program product is operable such that the index is displayed graphically.

10. The computer program product as recited in claim 9, wherein the computer program product is operable such that the index is displayed utilizing a bar-graph.

11. The computer program product as recited in claim 1, wherein the computer program product is operable such that the index is displayed utilizing a color coding.

12. The computer program product as recited in claim 11, wherein the computer program product is operable such that the color coding correlates with the degree of risk associated with the status.

13. The computer program product as recited in claim 1, and further comprising computer code for displaying additional information relating to the status upon a selection of the displayed index.

14. The computer program product as recited in claim 13, wherein the additional information includes a link capable of being selected by a user.

15. The computer program product as recited in claim 14, and further comprising computer code for taking an action to decrease the degree of risk associated with the status, in response to a selection of the link by the user.

16. A computer program product comprising a computer readable storage medium storing instructions, comprising:
   computer code for identifying a status of at least one security application;
   computer code for calculating an index representative of a degree of risk associated with the status of the at least one security application; and
   computer code for displaying the index;
   wherein the index includes an overall index reflecting a plurality of security applications.

17. The computer program product as recited in claim 16, wherein the computer program product is operable such that the overall index is calculated using a weighted average of a plurality of separate indices associated with each of the security applications.

18. The computer program product as recited in claim 16, wherein the security applications include an anti-virus security application.

19. The computer program product as recited in claim 16, wherein the security applications include a firewall security application.

20. The computer program product as recited in claim 16, wherein the security applications include a privacy service security application.

21. The computer program product as recited in claim 16, wherein the computer program product is operable such that the index is displayed graphically.

22. The computer program product as recited in claim 16, wherein the computer program product is operable such that the index is displayed utilizing a color coding.

23. The computer program product as recited in claim 22, wherein the color coding includes at least one of a red color, a yellow color, and a green color.

24. The computer program product as recited in claim 23, wherein the color coding includes the red color for indicating that a security vulnerability is present.

25. The computer program product as recited in claim 23, wherein the color coding includes the green color for indicating that protection is present.

26. The computer program product as recited in claim 16, wherein the computer program product is operable such that the index is displayed as a colored indicator.

27. The computer program product as recited in claim 16, wherein the overall index reflects a signature file of at least one of the plurality of security applications.

28. The computer program product as recited in claim 16, wherein the computer program product is operable such that at least one of the applications performs an automatic scan.

29. The computer program product as recited in claim 16, wherein the computer program product is operable such that at least one of the applications automatically cleans a file.

30. The computer program product as recited in claim 16, wherein the overall index reflects an update status of at least one of the security applications.

31. A computer program product comprising a computer readable storage medium storing instructions, comprising:
    computer code for identifying a status of at least one security application;
    computer code for calculating an index representative of a degree of risk associated with the status of the at least one security application; and
    computer code for displaying the index;
    wherein the computer program product is operable such that the index is associated with the status of an anti-virus security application;
    wherein the index reflects a signature file of the anti-virus security application.

32. A computer program product comprising a computer readable storage medium storing instructions, comprising:
    computer code for identifying a status of at least one security application;
    computer code for calculating an index representative of a degree of risk associated with the status of the at least one security application; and
    computer code for displaying the index;
    wherein the computer program product is operable such that the index is associated with the status of an anti-virus security application;
    wherein the index reflects a version of the anti-virus security application.

33. A computer program product comprising a computer readable storage medium storing instructions, comprising:
    computer code for identifying a status of at least one security application;
    computer code for calculating an index representative of a degree of risk associated with the status of the at least one security application; and
    computer code for displaying the index;
    wherein the computer program product is operable such that the index is associated with the status of an anti-virus security application;
    wherein the computer program product is operable such that the index is calculated using a weighted average of a plurality of aspects of the anti-virus security application includes at least one of a signature file of the anti-virus security application and a version of the anti-virus security application.

34. A computer program product comprising a computer readable storage medium storing instructions, comprising:
    computer code for identifying a status of at least one security application;
    computer code for calculating an index representative of a degree of risk associated with the status of the at least one security application; and
    computer code for displaying the index;
    wherein the computer program product is operable such that the index is associated with the status of a firewall security application;
    wherein the index reflects a version of the firewall security application.

35. A computer program product comprising a computer readable storage medium storing instructions, comprising:
    computer code for identifying a status of at least one security application;
    computer code for calculating an index representative of a degree of risk associated with the status of the at least one security application; and
    computer code for displaying the index;
    wherein the computer program product is operable such that the index is associated with the status of a privacy service security application;
    wherein the index reflects a version of the privacy service security application.

36. A computer program product comprising a computer readable storage medium storing instructions, comprising:
    computer code for determining a degree of risk associated with a plurality of security aspects associated with a computing environment of a computer; and
    computer code for visually displaying the degree of risk associated with the security aspects utilizing a plurality of visual indicators;
    wherein the degree of risk reflects a signature file of an anti-virus security application.

37. A computer program product comprising a computer readable storage medium storage instructions, comprising:
    computer code for identifying a status of a plurality of security applications;
    computer code for calculating an individual index representative of a degree of risk associated with the status of each of the security applications, wherein each individual index is calculated using a plurality of aspects of the status of the security applications;
    computer code for calculating an overall index representative of a degree of risk associated with a collective status of the security applications, the calculating of the overall index including a weighted average of the individual indices associated with each of the security applications; and
    computer code for displaying each individual index and the overall index;
    wherein the overall index reflects a signature file of an anti-virus security application;
    wherein the overall index reflects versions of the security applications.

38. A computer program product comprising a computer readable storage medium storing instructions, comprising:
    computer code for identifying a status of a security application;
    computer code for representing the status of the security application in the form of a colored indicator; and
    computer code for displaying the colored indicator;
    wherein the colored indicator includes a red color to indicate that the security application is at least one of not installed, disabled, and expired.

39. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the colored indicator includes a color including at least one of red, amber, and green;
  wherein the color includes red to indicate that the security application is at least one of not installed, disabled, and expired.

40. A computer program product comprising a computer readable storage medium storing instructions, comprising:
  computer code for identifying a status of a security application;
  computer code for representing the status of the security application in the form of a colored indicator; and
  computer code displaying the colored indicator;
  wherein the colored indictor includes a color including at least one of red, amber, and green;
  wherein the color includes green to indicate that the security application is at least one of installed and running.

41. A computer program product comprising a computer readable storage medium storing instructions, comprising:
  computer code for determining a degree of risk associated with at least one security aspect associated with a computing environment of a computer; and
  computer code for visually displaying the degree of risk associated with the at least one security aspect utilizing at least one visual indicator;
  wherein the degree of risk reflects a signature file of an anti-virus security application.

42. A computer program product comprising a computer readable storage medium storing instructions, comprising:
  computer code for determining a degree of risk associated with at least one security aspect associated with a computing environment of a computer; and
  computer code for visually displaying the degree of risk associated with the at least one security aspect utilizing at least one visual indicator;
  wherein the degree of risk reflects a version of an anti-virus security application.

43. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the status reflects a signature file of an anti-virus security application.

44. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the status reflects a version of an anti-virus security application.

45. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the status reflects a signature file of an anti-virus security application;
  wherein the status reflects whether the anti-virus security application is enabled;
  wherein the anti-virus security application is at least one of enabled or disabled upon a manual selection;
  wherein the computer program product is operable such that a scan icon is included for scanning data upon selection of the scan icon.

46. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the status reflects a version of an anti-virus security application;
  wherein the status reflects whether the anti-virus security application is enabled;
  wherein the computer program product is operable such that the anti-virus security application is at least one of enabled or disabled upon a manual selection;
  wherein the computer program product is operable such that a scan icon is included for scanning data upon selection of the scan icon.

47. A computer program product comprising a computer readable storage medium storing instructions, comprising:
  computer code for identifying a status of a security application;
  computer code for representing the status of the security application in the form of a colored indicator; and
  computer code for displaying the colored indicator;
  wherein the colored indicator includes a red color to indicate that the security application is at least one of not installed, disabled, and expired;
  wherein the colored indicator includes a green color to indicate that the security application is at least one of installed and running.

* * * * *